(12) United States Patent  (10) Patent No.: US 7,573,318 B2
Kim  (45) Date of Patent: Aug. 11, 2009

(54) INTERNAL VOLTAGE GENERATING CIRCUIT

(75) Inventor: Myung-Jin Kim, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 127 days.

(21) Appl. No.: 11/826,501

(22) Filed: Jul. 16, 2007

(65) Prior Publication Data

US 2008/0169865 A1 Jul. 17, 2008

(30) Foreign Application Priority Data

Jan. 11, 2007 (KR) ...................... 10-2007-0003434

(51) Int. Cl.
G05F 1/575 (2006.01)
H03B 1/00 (2006.01)
(52) U.S. Cl. ...................... 327/535; 327/540
(58) Field of Classification Search ........................ None
See application file for complete search history.

(56) References Cited

U.S. PATENT DOCUMENTS

| 5,889,440 | A | * | 3/1999 | Kowshik ...................... 331/57 |
| 6,150,860 | A | | 11/2000 | Chun |
| 6,157,267 | A | | 12/2000 | Kakimura |
| 6,522,193 | B2 | | 2/2003 | Shin |
| 6,958,947 | B2 | | 10/2005 | Park et al. |
| 7,009,457 | B2 | * | 3/2006 | Kim ............................ 331/57 |
| 7,046,074 | B2 | | 5/2006 | Jang |
| 7,224,207 | B2 | * | 5/2007 | Chou et al. .................. 327/536 |
| 7,227,398 | B2 | | 6/2007 | Rosen ......................... 327/292 |
| 7,266,474 | B2 | * | 9/2007 | Habitz et al. ................ 702/182 |
| 2004/0155701 | A1 | | 8/2004 | Kim et al. |
| 2006/0140020 | A1 | | 6/2006 | Do |
| 2007/0069804 | A1 | * | 3/2007 | Kim et al. .................... 327/536 |

FOREIGN PATENT DOCUMENTS

| KR | 10-1995-0015744 | 6/1995 |
| KR | 1020040005235 | 1/2004 |
| KR | 1020040067016 | 7/2004 |

* cited by examiner

Primary Examiner—Lincoln Donovan
Assistant Examiner—Terry L Englund
(74) Attorney, Agent, or Firm—Venable LLP; Jeffri A. Kaminski

(57) ABSTRACT

An internal voltage generating circuit includes a first detector that compares an internal voltage and a first reference voltage to output a first detection signal. A second detector compares a supply voltage and a second reference voltage to output a second detection signal. A loop selection oscillator performs an oscillation operation in response to the first detection signal, selects a first loop or a second loop for performing the oscillation operation in response to the second detection signal, and outputs an oscillation signal. A charge pump performs a pumping operation according to the output of the loop selection oscillator and generates the internal voltage.

18 Claims, 3 Drawing Sheets

[FIG. 1]
PRIOR ART
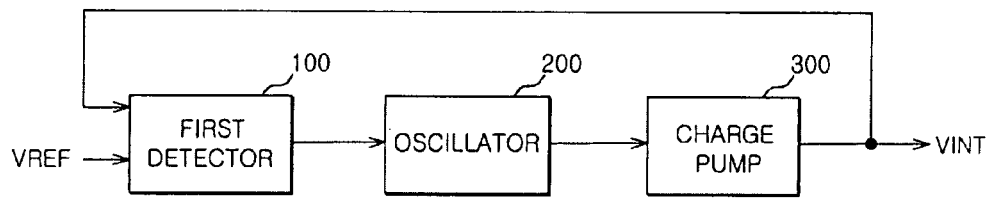
[FIG. 2]
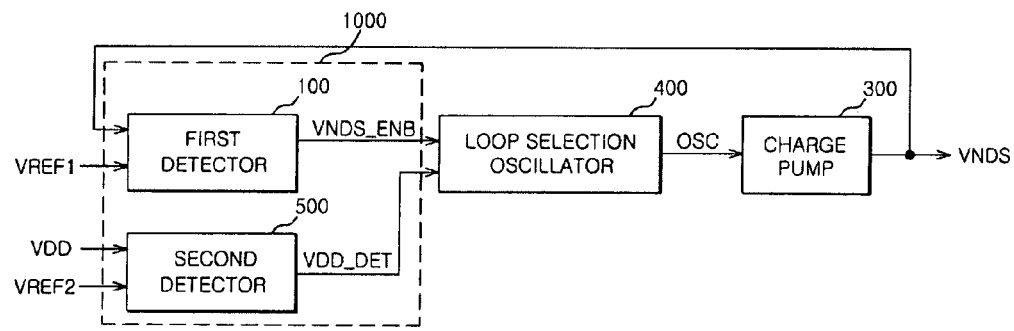
[FIG. 3]
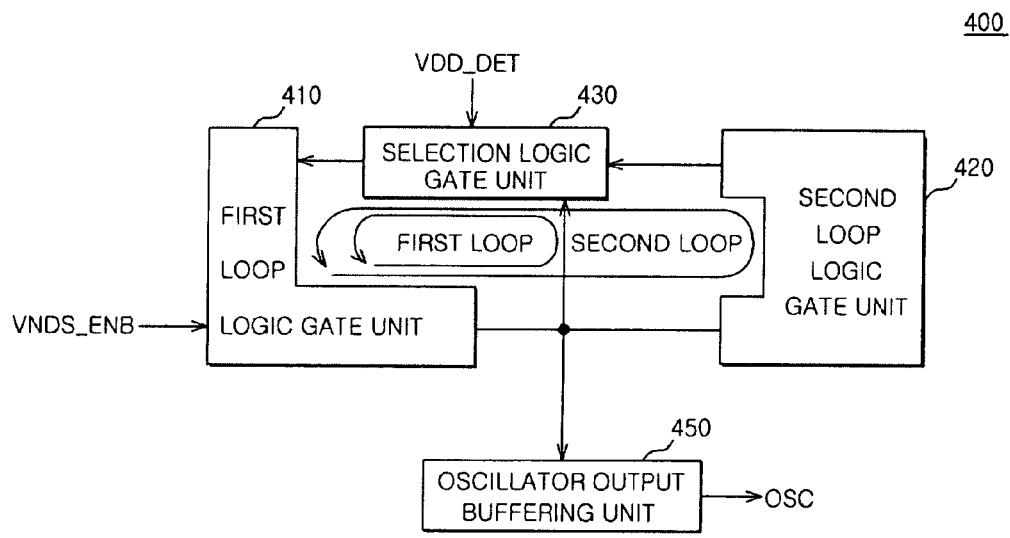

[FIG. 4]
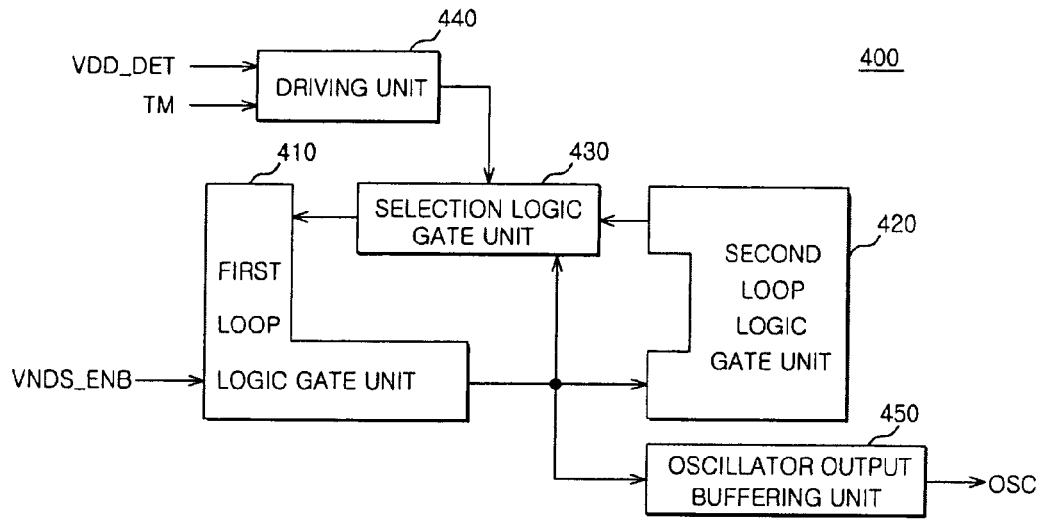
[FIG. 5]
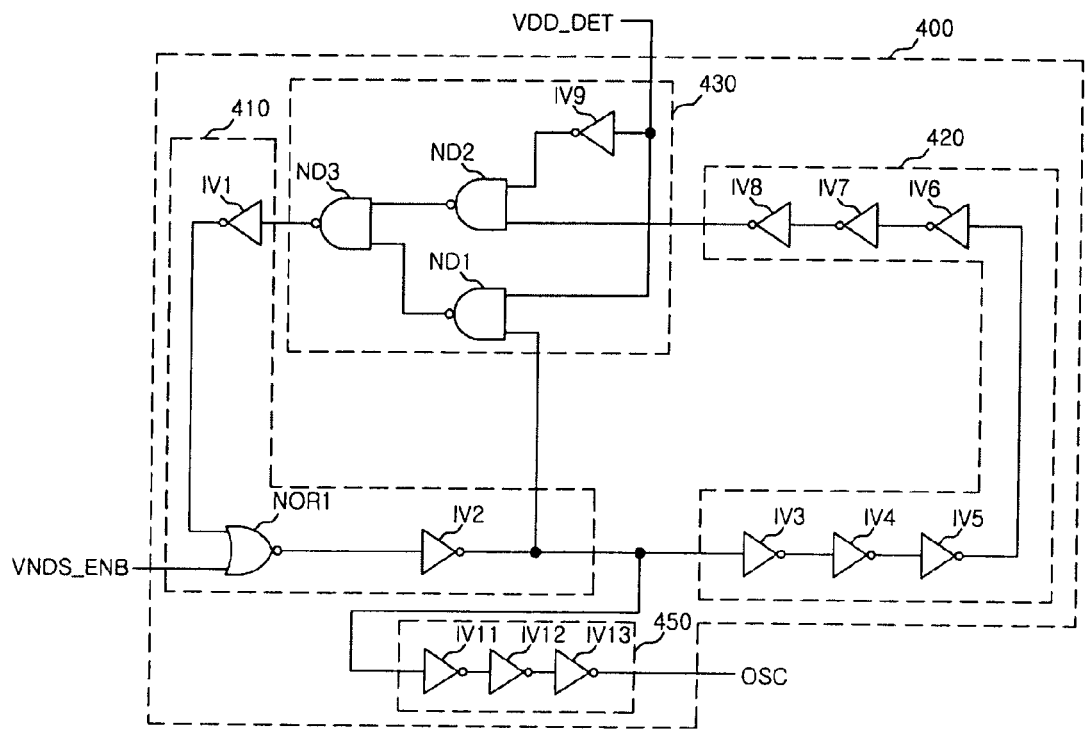

[FIG. 6]
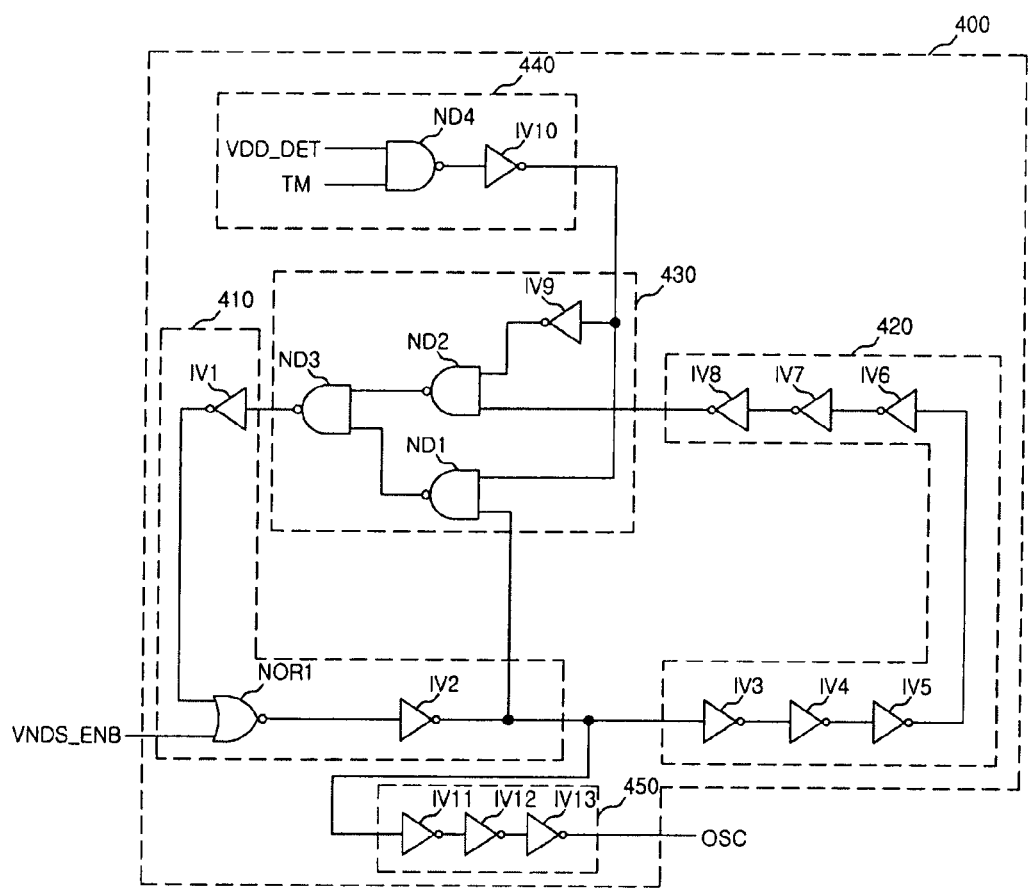

INTERNAL VOLTAGE GENERATING CIRCUIT

CROSS-REFERENCE TO RELATED PATENT APPLICATION

This application claims the benefit of Korean Patent Application No. 10-2007-0003434, filed on Jan. 11, 2007, in the Korean Intellectual Property Office, the disclosure of which is incorporated herein in its entirety by reference.

BACKGROUND OF THE INVENTION

1. Technical Field

Embodiments of the present invention relate to a semiconductor integrated circuit, and more particularly, to an internal voltage generating circuit.

2. Related Art

In general, an internal voltage generating circuit generates an internal voltage that is used in a semiconductor memory apparatus. Examples of the internal voltage generating circuit include a bootstrapping voltage VPP generating circuit that generates an internal voltage higher than a supply voltage, a back bias voltage VBB generating circuit that generates an internal voltage lower than a ground voltage, and a reference voltage VREF generating circuit that generates a reference voltage, and the like.

For example, in the case of the semiconductor memory apparatus, the bootstrapping voltage VPP generating circuit is used to activate word lines. A back bias voltage VBB that is generated by the back bias voltage generating circuit is applied to an N-well where a PMOS transistor is formed and adjusts a threshold voltage Vth of the PMOS transistor.

As shown in FIG. 1, a general internal voltage generating circuit includes a first detector 100 that compares an internal voltage VINT and a reference voltage VREF, detects a result of the comparison and outputs a signal based thereon, an oscillator 200 that outputs a pulse signal in response to a signal output by the first detector 100, and a charge pump 300 that performs, when a pulse signal is applied to the charge pump 300 from the oscillator 200, a pumping operation so as to pump the internal voltage VINT.

The charge pump 300 continuously performs a pumping operation until the internal voltage VINT output by the charge pump 300 reaches a target value. Accordingly, after the internal voltage VINT reaches the target value, the charge pump 300 stops the pumping operation, and maintains the internal voltage VINT.

However, when a supply voltage VDD that drives the internal voltage generating circuit is low, a small amount of current is supplied to elements that are provided in the oscillator 200, and a cycle of the signal output by the oscillator is lengthened. As a result, it is difficult for the output signal of the oscillator 200 to be supplied to the charge pump 300 so as to stably generate the internal voltage VINT.

In recent years, as the supply voltage VDD of the semiconductor memory apparatus is lowered, the supply voltage VDD becomes unstable, which causes the internal voltage VINT to be unstable.

SUMMARY

Embodiments of the present invention may provide an internal voltage generating circuit that may be capable of stably generating an internal voltage even when a supply voltage is low. Another embodiment of the present invention may provide an internal voltage generating circuit that may be capable of generating substantially a constant internal voltage (excepting for noise and other slight variations) even when a voltage level of a supply voltage varies.

An embodiment of the present invention may provide an internal voltage generating circuit. The internal voltage generating circuit may include a first detector that may compare an internal voltage and a first reference voltage to output a first detection signal, a second detector that may compare a supply voltage and a second reference voltage to output a second detection signal, a loop selection oscillator that may perform an oscillation operation in response to the first detection signal, may select a first loop or a second loop for performing the oscillation operation in response to the second detection signal, and may output an oscillation signal, and a charge pump that may perform a pumping operation according to the output of the loop selection oscillator and may generate the internal voltage.

Another embodiment of the present invention may provide an internal voltage generating circuit. The internal voltage generating circuit may include a multiple detector that may compare an internal voltage and a first reference voltage to output a first detection signal, and may compare a supply voltage and a second reference voltage to output a second detection signal, a loop selection oscillator that may perform an oscillation operation in response to the first detection signal, may select a first loop or a second loop for performing the oscillation operation in response to the second detection signal, and may output an oscillation signal, and a charge pump that may perform a pumping operation according to the output of the loop selection oscillator and may generate the internal voltage.

BRIEF DESCRIPTION OF THE DRAWINGS

FIG. 1 is a block diagram illustrating a general internal voltage generating circuit;

FIG. 2 is a block diagram illustrating an exemplary internal voltage generating circuit according to an embodiment of the present invention;

FIG. 3 is a block diagram illustrating an exemplary inner structure of a loop selection oscillator according to an embodiment of the present invention;

FIG. 4 is a block diagram illustrating an exemplary inner structure of a loop selection oscillator according to another embodiment of the present invention;

FIG. 5 is a circuit diagram illustrating an example of a loop selection oscillator shown, in FIG. 3; and FIG. 6 is a circuit diagram illustrating an example a loop selection oscillator shown in FIG. 4.

DESCRIPTION OF EXEMPLARY EMBODIMENT

Embodiments of the invention will now be described in detail with reference to the accompanying drawings.

Referring to FIG. 2, an exemplary internal voltage generating circuit according to an embodiment of the present invention may includes a multiple detector 1000, a loop selection oscillator 400, and a charge pump 300.

An internal voltage that maybe output by the internal voltage generating circuit may be used as an internal voltage for essentially any semiconductor integrated circuit. In this embodiment, an internal voltage generating circuit that may generate an internal voltage VNDS will be exemplified.

The multiple detector 1000 may compare the internal voltage VNDS with a first reference voltage VREF1 to output a first detection signal VNDS_ENB, and compare a supply voltage VDD with a second reference voltage VREF2 to output a second detection signal VDD_DET.

The multiple detector 1000 may include a first detector 100 and a second detector 500.

The first detector 100 may compare the internal voltage VNDS, which is generated by the charge pump 300 and is fed back to the first detector 100, and the first reference voltage VREF1, thereby outputting the first detection signal VNDS_ENB. That is, if the internal voltage VNDS is higher than the first reference voltage VREF1, the first detector 100 may output an enable signal that may drive the loop selection oscillator 400. In accordance with the enable signal, the loop selection oscillator 400 and the charge pump 300 may be driven, and the internal voltage VNDS may reach a target value. The first detector 100 may be implemented, for example, by a general level detector circuit.

The second detector 500 may compare the supply voltage VDD, and the second reference voltage VREF2 and outputs the second detection signal VDD_DET. The supply voltage VDD may be a power supply voltage of the internal voltage generating circuit and may be supplied from the outside of the internal voltage generating circuit. In the general internal voltage generating circuit, when the supply voltage VDD is low, the oscillator 200 that generates an oscillation signal and the charge pump 300 cannot be normally driven, which generates the unstable internal voltage VNDS. In contrast, according to this embodiment, when the supply voltage VDD is equal to or larger than a predetermined voltage, an oscillator having a predetermined oscillation period may be driven, and when the supply voltage VDD is smaller than the predetermined voltage, an oscillator, which may have an oscillation period different from the predetermined oscillation period, may be driven. That is, the internal voltage generating circuit according to this embodiment may further includes the second detector 500 that may output a different oscillation signal according to a voltage level of the supply voltage VDD. That is, when the supply voltage VDD is higher or lower than the second reference voltage VREF2, the second detector 500 may output a low signal or a high signal.

Accordingly, when the supply voltage VDD is lower than the second reference voltage VREF2, the loop selection oscillator 400 may select a short loop. As used here, a loop may mean a closed circuit. Thus, the loop selection oscillator 400 may generate an oscillation signal having a short cycle such that the charge pump 300 may generate the corresponding voltage at a high speed. As a result, it may be possible to prevent the oscillation period of the loop selection oscillator 400 from increasing due to the low supply voltage VDD. According to this embodiment, it may be possible to resolve the problem according to the related art in that when the supply voltage VDD is low, the cycle of the signal that is generated by the oscillator 200 becomes longer, and thus an unstable internal voltage VNDS is generated.

The second detector 500 may be implemented by, for example, a general level detector circuit. The second detector 500 may receive the second reference voltage VREF2 and the supply voltage VDD and compare them. At this time, when the supply voltage VDD is higher or lower than the second reference voltage VREF2, the second detector 500 may output a high signal or a low signal.

The loop selection oscillator 400 may perform an oscillation operation in response to the first detection signal VNDS_ENB. In response to the second detection signal VDD_DET, the loop selection oscillator 400 may select a first loop or a second loop for performing the oscillation and output an oscillation signal OSC. The second loop may be longer than the first loop in an oscillation signal cycle. Basically, the loop selection oscillator 400 may the same structure as, for example, a general ring oscillator. However, in accordance with the output signal VDD_DET of the second detector 500, an oscillation path may be set by a different loop path.

The charge pump 300 may perform a pumping operation according to the output of the loop selection oscillator 400 and generate the internal voltage VNDS. The charge pump 300 may be implemented by, for example, a general charge pump circuit.

As shown in FIG. 3, an exemplary loop selection oscillator 400 may include a first loop logic gate unit 410, a second loop logic gate unit 420, a selection logic gate unit 430, and an oscillator output buffering unit 450.

The first loop logic gate unit 410 may include, for example, logic gates that form the first loop and the second loop in common, and receive the output VNDS_ENB of the first detector 100. The first loop logic gate unit 410 may start or stops an oscillation operation on the first loop or the second loop in accordance with the output VNDS_ENB of the first detector 100. When the supply voltage VDD is lower than the second reference voltage VREF2, the first loop may be driven according to the output VDD_DET of the second detector 500, and a signal having a short oscillation cycle may be output.

The second loop logic gate unit 420 may include, for example, logic gates that form only the second loop. Accordingly, the second loop may be formed by the logic gates forming the first loop and the logic gates forming the second loop logic gate unit 420. When the supply voltage VDD is higher than the second voltage VREF2, the second loop may be driven in accordance with the output VDD_DET of the second detector 500, and a signal having a long oscillation period may be output.

The selection logic gate unit 430 may receive the output VDD_DET of the second detector 500 to select the first loop or the second loop according to the output VDD_DET. In order to allow the oscillation operation to be performed on the first loop or the second loop, a number of logic gates, for example, an odd number of logic gates, may be sequentially coupled such that an output terminal of a last logic gate is electrically coupled to an input terminal of a first logic gate. The selection logic gate unit 430 may connect an output terminal of a last logic gate on the first loop or the second loop to the input terminal of the first logic gate. As shown in FIG. 5, described in more detail below, in accordance with the output VDD_DET of the second detector 500, the selection logic gate unit 430 may allow the logic gates in the selection logic gate unit 430 to invert or not to invert the input signal.

As shown in FIG. 4, the exemplary loop selection oscillator 400 may further include the driving unit 440.

The driving unit 440 may select the first loop or the second loop in accordance with a control signal TM. If the control signal TM is enabled, the loop selection oscillator 400 may select the first loop or the second loop in accordance with a voltage level of the second detection signal VDD_DET and operate through the selected loop. Meanwhile, if the control signal TM is disabled, the loop selection oscillator 400 may operate through the second loop regardless of a voltage level of the second detection signal VDD_DET. The driving unit 400 may be, for example, a circuit that drives a general circuit.

FIG. 5 is a circuit diagram illustrating an example of a loop selection oscillator 400 shown in FIG. 3.

The first loop logic gate unit 410 may include, for example, a chain of logic gates that may invert an output of the selection logic gate unit 430 in accordance with the first detection signal VNDS_ENB.

The exemplary first loop logic gate unit 410 may include a first inverter IV1 that may invert the output of the selection logic gate unit 430, a first NOR gate NOR1 that may receive the output VNDS_ENB of the first detector 100 and the output of the first inverter IV1, and a second inverter IV2 that may invert the output of the first NOR gate NOR1.

The exemplary second loop logic gate unit 420 may include, for example, a chain of inverters that may invert the output of the first loop logic gate unit 410 and provide the output thereof to the selection logic gate unit 430.

The exemplary second loop logic gate unit 420 may include a chain of inverters IV3 to IV8 that may invert the output of the first loop logic gate unit 410.

The exemplary selection logic gate unit 430 may include, for example, logic gates that drive the first loop or the second loop in accordance with the second detection signal VDD_DET.

Specifically, the selection logic gate unit 430 may include a first NAND gate ND1, a second NAND gate ND2, and a third NAND gate ND3.

The first NAND gate ND1 may receive the output of the first loop logic gate unit 410 and the output VDD_DET of the second detector 500. Further, the second NAND gate ND2 may receive the output of the second loop logic gate unit 420 and an inverted signal of the output VDD_DET of the second detector 500. An inverter IV9 may be provided to invert output VDD_DET of the second detector 500. Further, the third NAND gate ND3 may receive the output of the first NAND gate ND1 and the second NAND gate ND2 and output the operation result to the first loop logic gate unit 410.

The exemplary oscillator output buffering unit 450 may include, for example, a chain of inverters IV11 to IV13 that may invert the output of the second inverter IV2. The oscillator output buffering unit 450 may buffer the output of the second inverter IV2. The oscillator output buffering unit 450 may receive the output of the second inverter IV2 and output it to the charge pump 300. However, in addition to the output of the second inverter IV2, the oscillator output buffering unit 450 may receive the output of the inverters IV1 to IV8, the first NOR gate NOR1, or the third NAND gate ND3 in the loop selection oscillator 400, and may output them to the charge pump 300.

An example of the operation of the exemplary loop selection oscillator 400 shown in FIG. 5 is as follows.

If the internal voltage VNDS is lower than the first reference voltage VREF1, the output VNDS_ENB of the first detector 100 may be at a high level. As a result, the output of the first NOR gate NOR1 becomes a low level, and the loop selection oscillator 400 may not perform an oscillation operation.

If the internal voltage VNDS is higher than the first reference voltage VREF1, the output VNDS_ENB of the first detector 100 may be at a low level. Since the output of the first NOR gate NOR1 is an inverted signal of the input of the first NOR gate NOR1, the first NOR gate NOR1 functions as a logic gate that inverts the output of the first inverter IV1. Accordingly, the loop selection oscillator 400 may alternately generate a low signal and a high signal.

If the internal voltage VNDS is higher than the first reference voltage VREF1 and the supply voltage VDD is lower than the second reference voltage VREF2, the output VNDS_ENB of the first detector 100 may be at a low level and the output VDD_DET of the second detector 500 may be at a high level.

Accordingly, since the output of the second NAND gate ND2 that may be provided in the selection logic gate unit 430 is at a high level, the oscillation operation may not be performed through the second loop. Since the first NAND gate ND1 outputs an inverted signal of the output of the first loop logic gate unit 410, the oscillation operation may be performed through the first loop. The oscillation signal that may be generated by the first loop is input to the charge pump 300 and may generate the internal voltage VNDS. If the oscillation operation having a short cycle is performed through the first loop, it may be possible to prevent unstable internal voltage VNDS from being generated when the supply voltage VDD is low. That is, it may be possible to prevent the oscillation period of the loop selection oscillator from increasing when the supply voltage VDD is low, which generates a stable internal voltage VNDS.

If the internal voltage VNDS is higher than the first reference voltage VREF1 and the supply voltage VDD is higher than the second reference voltage VREF2, the output of the first detector 100 may be at a low level, and the output of the second detector 500 may be at a low level. Accordingly, since the output of the second NAND gate ND2 corresponds to an inverted signal of the output of the second loop logic gate unit 420, the oscillation operation may be performed through the second loop. At this time, the output VDD_DET of the second detector 500 is input to the first NAND gate ND1. Since the output of the first NAND gate ND1 is at a high level, the oscillation signal may not be generated through the first loop.

Accordingly, the oscillation operation may be selectively performed through the first loop or the second loop in accordance with the output of the second detector 500. When the supply voltage VDD is low, the oscillation operation may be performed through the first loop where the number of logic gates is smaller than the second loop. As a result, the output cycle of the signal of the loop selection oscillator becomes short, and it may be possible to prevent an oscillation period of the loop selection oscillator from increasing due to the low supply voltage VDD. Accordingly, the charge pump 300 may generate the internal voltage VNDS of the target value.

Meanwhile, as shown in FIG. 6, an exemplary driving unit 440 may include a fourth NAND gate ND4 that may receive the output VDD_DET of the second detector 500 and the control signal TM, and a tenth inverter IV10 that outputs an inverted signal of the fourth NAND gate ND4. Accordingly, when the control signal TM is at a low level, the output of the driving unit 440 may be at a low level regardless of the output VDD_DET of the second detector 500. Therefore, the loop selection oscillator 400 may output the oscillation signal OSC through the second loop regardless of the output of the second detector 500. When the control signal TM is at a high level, the output level of the driving unit 440 may be determined in accordance with the output VDD_DET of the second detector 500, and the loop selection oscillator 400 may output an oscillation signal OSC through the first loop or the second loop.

The first loop logic gate unit 410, the second loop logic gate unit 420, the oscillator output buffering unit 450, and the selection logic gate unit 430 are also shown in FIG. 5 and may have the same structure in the embodiment shown in FIG. 6.

A description an example of the operation of the exemplary internal voltage generating circuit of FIG. 2 that includes the exemplary loop selection oscillator 400 of FIG. 6 is provided.

If the control signal TM becomes a high level, the loop selection oscillator 400 may be driven. Further, when the internal voltage VNDS does not reach the target value, the output of the first detector 100 may become a low level. When the supply voltage VDD is higher than the second reference voltage VREF2, the output of the second detector 500 may be at a high level. Accordingly, the output of the first NAND gate ND1 that may be included in the selection logic gate unit 430 becomes a low level, and the oscillation operation may be performed through the first loop.

Further, when the supply voltage VDD is lower than the second reference voltage VREF2, the output of the second detector 500 may be at a low level, and the output of the second NAND gate ND2 of the selection logic gate unit 430 may become a low level. As a result, the oscillation operation may be performed through the second loop. Accordingly, the output of the loop selection oscillator 400 may be input to the charge pump 300, which drives the charge pump 300. The charge pump 300 may lower the internal voltage VNDS to the target value of the internal voltage VNDS, and the output of the charge pump 300 may be input to the first detector 100.

When the internal voltage VNDS reaches the target value, the output of the first detector 100 may be at a high level. Thus, the loop selection oscillator 400 may not perform an oscillation operation, and further, the charge pump 300 may not operate.

The second detector 500 may select the first loop or the second loop, when the supply voltage VDD is higher or lower than the second reference voltage VREF2. However, the present invention is not limited thereto, and, for example, a third loop and a fourth loop may be added by using third and fourth voltages. Accordingly, the cycle of the oscillator may be set differently according to the voltage level of the supply voltage VDD, which may achieve an optimal oscillator in terms of area, internal voltage stability, driving force, or the like.

It will be apparent to those skilled in the art that various modifications and changes may be made without departing from the scope and spirit of the invention. Therefore, it should be understood that the above embodiments are not limitative, but illustrative in all aspects. The scope of the invention is defined by the appended claims rather than by the description preceding them, and therefore all changes and modifications that fall within metes and bounds of the claims, or equivalents of such metes and bounds are therefore intended to be embraced by the claims.

What is claimed is:

1. An internal voltage generating circuit comprising: a first detector configured to compare an internal voltage and a first reference voltage and to output a first detection signal based on the comparison;
a second detector configured to compare a supply voltage and a second reference voltage and to output a second detection signal based on the comparison;
a loop selection oscillator configured to perform an oscillation operation in response to the first detection signal, select a first loop or a second loop for performing the oscillation operation in response to the second detection signal to obtain the selected loop, and output an oscillation signal from the selected loop; and
a charge pump configured to perform a pumping operation according to the oscillation signal output from the loop selection oscillator and generate the internal voltage.

2. The internal voltage generating circuit of claim 1, wherein the loop selection oscillator has an oscillation period that is shorter when the loop selection oscillator selects the first loop compared to when the loop selection oscillator selects the second loop.

3. The internal voltage generating circuit of claim 2, wherein the loop selection oscillator is configured to select the second loop when the second detection signal indicates that the supply voltage is higher than the second reference voltage, and to select the first loop when the second detection signal indicates that the supply voltage is lower than the second reference voltage.

4. The internal voltage generating circuit of claim 3, wherein the loop selection oscillator includes:
a first loop logic gate unit including logic gates configured to receive the first detection signal and that form part of both the first loop and the second loop and to provide an output;
a second loop logic gate unit including logic gates that form part of the second loop and not part of the first loop and that provide an output; and
a selection logic gate unit configured to receive the second detection signal, select either the first loop or the second loop to be selectively operated in accordance with the second detection signal and outputs a signal based thereon.

5. The internal voltage generating circuit of claim 4, wherein the loop selection oscillator further includes a driving unit coupled to the selection logic gate unit and configured to also select the first loop or the second loop in accordance with a control signal.

6. The internal voltage generating circuit of claim 4, wherein the logic gates of the first loop logic gate unit include a chain of logic gates configured to invert the signal output from the selection logic gate unit in accordance with the first detection signal.

7. The internal voltage generating circuit of claim 6, wherein the chain of logic gates of the first loop logic gate unit includes:
a first inverter configured to receive the signal output from the selection logic gate unit as an input and to provide an output;
a NOR gate configured to receive the first detection signal and the output of the first inverter as inputs and to provide an output; and
a second inverter configured to receive the output of the NOR gate as an input and having an output coupled to an input of the selection logic gate unit.

8. The internal voltage generating circuit of claim 4, wherein the logic gates of the second loop logic gate unit include a chain of logic gates configured to receive the output of the first loop logic gate unit as an input.

9. The internal voltage generating circuit of claim 8, wherein the chain of logic gates in the second loop logic gate unit includes a chain of inverters configured to invert the output of the first loop logic gate unit and having an output coupled to an input of the selection logic gate unit.

10. The internal voltage generating circuit of claim 4, wherein the selection logic gate unit includes logic gates configured to drive the first loop or the second loop in accordance with the second detection signal.

11. The internal voltage generating circuit of claim 10, wherein the logic gates of the selection logic gate unit include:
a first NAND gate configured to receive the output of the first loop logic gate unit and the second detection signal as inputs and to provide an output based thereon;
a second NAND gate configured to receive the output of the second loop logic gate unit and an inverted signal of the second detection signal as inputs and to provide an output based thereon; and
a third NAND gate configured to receive the outputs of the first NAND gate and the second NAND gate and output an operation result to the first loop logic gate unit.

12. An internal voltage generating circuit comprising:
a multiple detector configured to compare an internal voltage and a first reference voltage to output a first detection signal, and compare a supply voltage and a second reference voltage to output a second detection signal;

a loop selection oscillator configured to perform an oscillation operation in response to the first detection signal, select a first loop or a second loop to obtain the selected loop for performing the oscillation operation in response to the second detection signal, and to output an oscillation signal from the selected loop; and a charge pump configured to perform a pumping operation according to the oscillation signal output from the loop selection oscillator and generate the internal voltage.

13. The internal voltage generating circuit of claim 12, wherein the loop selection oscillator is configured to select the second loop when the second detection signal indicates that the supply voltage is higher than the second reference voltage, and to select the first loop when the second detection signal indicates that the supply voltage is lower than the second reference voltage.

14. The internal voltage generating circuit of claim 13, wherein the loop selection oscillator includes:

a first loop logic gate unit including logic gates configured to receive the first detection signal as an input and that form part of both the first loop and the second loop;

a second loop logic gate unit including logic gates that are part of the second loop and not part of the first loop; and a selection logic gate unit configured to receive the second detection signal, and select either the first loop or the second loop to be selectively operated in accordance with the output of the second detection signal.

15. The internal voltage generating circuit of claim 14, wherein the loop selection oscillator further includes a driving unit coupled to the selection logic gate unit and configured to also select the first loop or the second loop in accordance with a control signal.

16. The internal voltage generating circuit of claim 15, wherein the logic gates of the first loop logic gate unit include:

a first inverter configured to receive an output of the selection logic gate unit as an input and to provide an output based thereon;

a NOR gate configured to receive the first detection signal and the output of the first inverter and to provide an output based thereon; and a second inverter configured to receive the output of the NOR gate as an input and to provide an output to the selection logic gate unit.

17. The internal voltage generating circuit of claim 16, wherein the logic gates of the second loop logic gate unit include a chain of inverters configured to invert an output of the first loop logic gate unit and having an output coupled to an input of the selection logic gate unit.

18. The internal voltage generating circuit of claim 17, wherein the selection logic gate unit includes:

a first NAND gate configured to receive the output of the first loop logic gate unit and the second detection signal as inputs and to provide an output based thereon;

a second NAND gate configured to receive the output of the second loop logic gate unit and an inversion signal of the second detection signal as inputs and to provide an output based thereon; and a third NAND gate configured to receive the outputs of the first NAND gate and the second NAND gate and output an operation result to the first loop logic gate unit.

\* \* \* \* \*